US012489956B2

(12) United States Patent
Chen et al.

(10) Patent No.: US 12,489,956 B2
(45) Date of Patent: Dec. 2, 2025

(54) CAPTIONING VIDEOS WITH MULTIPLE CROSS-MODALITY TEACHERS

(71) Applicant: Snap Inc., Santa Monica, CA (US)

(72) Inventors: Tsai-Shien Chen, Merced, CA (US);
Yuwei Fang, Redmond, WA (US);
Hsin-Ying Lee, San Jose, CA (US);
Jian Ren, Hermosa Beach, CA (US);
Aliaksandr Siarohin, Los Angeles, CA (US); Sergey Tulyakov, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 10 days.

(21) Appl. No.: 18/422,721

(22) Filed: Jan. 25, 2024

(65) Prior Publication Data
US 2025/0247586 A1 Jul. 31, 2025

(51) Int. Cl.
*H04N 21/488* (2011.01)
*G10L 15/26* (2006.01)
*H04N 21/845* (2011.01)

(52) U.S. Cl.
CPC ......... *H04N 21/4884* (2013.01); *G10L 15/26* (2013.01); *H04N 21/8456* (2013.01)

(58) Field of Classification Search
CPC . H04N 21/4884; H04N 21/8456; G10L 15/26
See application file for complete search history.

(56) References Cited

U.S. PATENT DOCUMENTS

| | | | |
|---|---|---|---|
| 10,958,982 B1* | 3/2021 | Ghose | H04N 21/23418 |
| 2020/0160843 A1* | 5/2020 | Shillingford | G10L 15/24 |
| 2020/0286476 A1* | 9/2020 | Abdulkader | G10L 15/01 |
| 2024/0370718 A1* | 11/2024 | Panagopoulou | G06N 3/045 |

OTHER PUBLICATIONS

Pyscenedetect. https://github.com/ Breakthrough / PySceneDetect, 2024.
Jean-Baptiste Alayrac, Jeff Donahue, Pauline Luc, Antoine Miech, Iain Barr, Yana Hasson, Karel Lenc, Arthur Mensch, Katherine Millican, Malcolm Reynolds, et al. Flamingo: a Visual Language Model for Few-Shot Learning. NeurIPS, 2022.
Lisa Anne Hendricks, Oliver Wang, Eli Shechtman, Josef Sivic, Trevor Darrell, and Bryan Russell. Localizing Moments in Video with Natural Language. In ICCV, 2017.
Yogesh Balaji, Seungjun Nah, Xun Huang, Arash Vahdat, Jiaming Song, Karsten Kreis, Miika Aittala, Timo Aila, Samuli Laine, Bryan Catanzaro, et al. ediff-i: Text-to-Image Diffusion Models with an Ensemble of Expert Denoisers. arXiv preprint, 2022.
(Continued)

*Primary Examiner* — Yassin Alata
(74) *Attorney, Agent, or Firm* — CM Law; Stephen J. Weed

(57) ABSTRACT

Automatic captioning pipelines and methods for automatically annotating video data with subtitles, which can be obtained using automatic speech recognition (ASR). An automatic captioning pipeline with inputs of multimodal data scales up the dataset of high-quality video-caption pairs. The automatic captioning pipeline generates video-caption pairs by establishing and using a large video-language dataset along with an automatic captioning approach leveraging multimodal inputs, such as textual video description, subtitles, and individual video frames.

18 Claims, 8 Drawing Sheets

(56) References Cited

OTHER PUBLICATIONS

Satanjeev Banerjee and Alon Lavie. METEOR: An Automatic Metric for MT Evaluation with Improved Correlation with Human Judgments. In ACL workshop, 2005.

Hangbo Bao, Li Dong, Songhao Piao, and Furu Wei. BEiT: BERT Pre-Training of Image Transformers. In ICLR, 2022.

Andreas Blattmann, Tim Dockhorn, Sumith Kulal, Daniel Mendelevitch, Maciej Kilian, Dominik Lorenz, Yam Levi, Zion English, Vikram Voleti, Adam Letts, et al. Stable Video Diffusion: Scaling Latent Video Diffusion Models to Large Datasets. arXiv preprint arXiv:2311.15127, 2023.

Andreas Blattmann, Robin Rombach, Huan Ling, Tim Dock-horn, Seung Wook Kim, Sanja Fidler, and Karsten Kreis. Align your Latents: High-Resolution Video Synthesis with Latent Diffusion Models. In CVPR, 2023.

Tim Brooks, Janne Hellsten, Miika Aittala, Ting-Chun Wang, Timo Aila, Jaakko Lehtinen, Ming-Yu Liu, Alexei Efros, and Tero Karras. Generating Long Videos of Dynamic Scenes. NeurIPS, 2022.

Minwoo Byeon, Beomhee Park, Haecheon Kim, Sungjun Lee, Woonhyuk Baek, and Saehoon Kim. Coyo-700m: Image-text pair dataset. https://github.com/kakaobrain/coyo-dataset, 2022.

Fabian Caba Heilbron, Victor Escorcia, Bernard Ghanem, and Juan Carlos Niebles. Activitynet: A Large-Scale Video Benchmark for Human Activity Understanding. In CVPR, 2015.

Soravit Changpinyo, Piyush Sharma, Nan Ding, and Radu Soricut. Conceptual 12M: Pushing Web-Scale Image-Text Pre-Training to Recognize Long-Tail Visual Concepts. In CVPR, 2021.

David Chen and William B Dolan. Collecting Highly Parallel Data for Paraphrase Evaluation. In ACL, 2011.

Jun Chen, Deyao Zhu, Xiaoqian Shen, Xiang Li, Zechu Liu, Pengchuan Zhang, Raghuraman Krishnamoorthi, Vikas Chandra, Yunyang Xiong, and Mohamed Elhoseiny. MiniGPT-v2: Large Language Model as a Unified Interface for Vision-Language Multi-Task Learning. arXiv preprint, 2023.

Ting Chen, Simon Kornblith, Mohammad Norouzi, and Geoffrey Hinton. A Simple Framework for Contrastive Learning of Visual Representations. In ICML, 2020.

Tsai-Shien Chen, Wei-Chih Hung, Hung-Yu Tseng, Shao-Yi Chien, and Ming-Hsuan Yang. Incremental False Negative Detection for Contrastive Learning. In ICLR, 2022.

Feng Cheng, Xizi Wang, Jie Lei, David Crandall, Mohit Bansal, and Gedas Bertasius. VindLU: A Recipe for Effective Video-and-Language Pretraining. In CVPR, 2023.

Wei-Lin Chiang, Zhuohan Li, Zi Lin, Ying Sheng, Zhang-hao Wu, Hao Zhang, Lianmin Zheng, Siyuan Zhuang, Yong-hao Zhuang, Joseph E. Gonzalez, Ion Stoica, and Eric P. Xing. Vicuna: An Open-Source Chatbot Impressing GPT-4 with 90%* chatGPT Quality, 2023.

Hyung Won Chung, Le Hou, Shayne Longpre, Barret Zoph, Yi Tay, William Fedus, Yunxuan Li, Xuezhi Wang, Mostafa Dehghani, Siddhartha Brahma, et al. Scaling Instruction-Finetuned Language Models. arXiv preprint, 2022.

Jacob Devlin, Ming-Wei Chang, Kenton Lee, and Kristina Toutanova. Bert: Pre-Training of Deep Bidirectional Transformers for Language Understanding. arXiv preprint, 2018.

Alexey Dosovitskiy, Lucas Beyer, Alexander Kolesnikov, Dirk Weissenborn, Xiaohua Zhai, Thomas Unterthiner, Mostafa Dehghani, Matthias Minderer, Georg Heigold, Sylvain Gelly, Jakob Uszkoreit, and Neil Houlsby. An Image is Worth 16x16 Words: Transformers For Image Recognition at Scale. In ICLR, 2021.

Yuxin Fang, Wen Wang, Binhui Xie, Quan Sun, Ledell Wu, Xinggang Wang, Tiejun Huang, Xinlong Wang, and Yue Cao. EVA: Exploring the Limits of Masked Visual Representation Learning at Scale. In Proceedings of the IEEE/CVF Conference on Computer Vision and Pattern Recognition, pp. 19358-19369, 2023.

Songwei Ge, Seungjun Nah, Guilin Liu, Tyler Poon, Andrew Tao, Bryan Catanzaro, David Jacobs, Jia-Bin Huang, Ming-Yu Liu, and Yogesh Balaji. Preserve Your Own Correlation: A Noise Prior for Video Diffusion Models. In ICCV, 2023.

Yuying Ge, Yixiao Ge, Xihui Liu, Dian Li, Ying Shan, Xiaohu Qie, and Ping Luo. Bridging Video-text Retrieval with Multiple Choice Questions. In CVPR, 2022.

Rohit Girdhar, Alaaeldin El-Nouby, Zhuang Liu, Mannat Singh, Kalyan Vasudev Alwala, Armand Joulin, and Ishan Misra. ImageBind: One Embedding Space to Bind Them All. In CVPR, 2023.

Yuwei Guo, Ceyuan Yang, Anyi Rao, Yaohui Wang, Yu Qiao, Dahua Lin, and Bo Dai. ANIMATEDIFF: Animate Your Personalized Text-to-Image Diffusion Models Without Specific Tuning. arXiv preprint, 2023.

Kaiming He, Xinlei Chen, Saining Xie, Yanghao Li, Piotr Dollar, and Ross Girshick. Masked Autoencoders are Scalable Vision Learners. In CVPR, 2022.

Yingqing He, Tianyu Yang, Yong Zhang, Ying Shan, and Qifeng Chen. Latent Video Diffusion Models for High-Fidelity Long Video Generation. arXiv preprint, 2023.

Jonathan Ho, William Chan, Chitwan Saharia, Jay Whang, Ruiqi Gao, Alexey Gritsenko, Diederik P. Kingma, Ben Poole, Mohammad Norouzi, David J Fleet, et al. Imagen Video: High Definition Video Generation with Diffusion Models. arXiv preprint, 2022.

Wenyi Hong, Ming Ding, Wendi Zheng, Xinghan Liu, and Jie Tang. CogVideo: Large-Scale Pretraining for Text-to-Video Generation Via Transformers. arXiv preprint, 2022.

Chao Jia, Yinfei Yang, Ye Xia, Yi-Ting Chen, Zarana Parekh, Hieu Pham, Quoc Le, Yun-Hsuan Sung, Zhen Li, and Tom Duerig. Scaling Up Visual and Vision-Language Representation Learning with Noisy Text Supervision. In ICML, 2021.

Sangho Lee, Jiwan Chung, Youngjae Yu, Gunhee Kim, Thomas Breuel, Gal Chechik, and Yale Song. ACAV100m: Automatic Curation of Large-Scale Datasets for Audio-Visual Video Representation Learning. In ICCV, 2021.

Jie Lei, Linjie Li, Luowei Zhou, Zhe Gan, Tamara L Berg, Mohit Bansal, and Jingjing Liu. Less is more: ClipBert for Video-and-Language Learning via Sparse Sampling. In CVPR, 2021.

Dongxu Li, Junnan Li, Hongdong Li, Juan Carlos Niebles, and Steven CH Hoi. Align and Prompt: Video-and- Language Pre-training with Entity Prompts. In CVPR, 2022.

Junnan Li, Ramprasaath Selvaraju, Akhilesh Gotmare, Shafiq Joty, Caiming Xiong, and Steven Chu Hong Hoi. Align before Fuse: Vision and Language Representation Learning with Momentum Distillation. NeurIPS, 2021.

Junnan Li, Dongxu Li, Caiming Xiong, and Steven Hoi. Blip: Bootstrapping Language-Image Pre-training for Unified Vision-Language Understanding and Generation. In ICML, 2022.

Junnan Li, Dongxu Li, Silvio Savarese, and Steven Hoi. Blip-2: Bootstrapping Language-Image Pre-training with Frozen Image Encoders and Large Language Models. arXiv preprint, 2023.

Kunchang Li, Yinan He, Yi Wang, Yizhuo Li, Wenhai Wang, Ping Luo, Yali Wang, Limin Wang, and Yu Qiao. VideoChat: Chat-Centric Video Understanding. arXiv preprint, 2023.

Kunchang Li, Yali Wang, Yizhuo Li, Yi Wang, Yinan He, Limin Wang, and Yu Qiao. Unmasked Teacher: Towards Training-Efficient Video Foundation Models. ICCV, 2023.

Chin-Yew Lin and Franz Josef Och. Automatic Evaluation of Machine Translation Quality Using Longest Common Subsequence and Skip-Bigram Statistics. In ACL, 2004.

Kevin Lin, Linjie Li, Chung-Ching Lin, Faisal Ahmed, Zhe Gan, Zicheng Liu, Yumao Lu, and Lijuan Wang. Swinbert: End-to-End Transformers with Sparse Attention for Video Captioning. In CVPR, 2022.

Tsung-Yi Lin, Michael Maire, Serge Belongie, James Hays, Pietro Perona, Deva Ramanan, Piotr Doll'ar, and C Lawrence Zitnick. Microsoft COCO: Common Objects in Context. In ECCV, 2014.

Haotian Liu, Chunyuan Li, Qingyang Wu, and Yong Jae Lee. Visual Instruction Tuning. arXiv preprint, 2023.

Yang Liu, Samuel Albanie, Arsha Nagrani, and Andrew Zis-serman. Use What You Have: Video Retrieval Using Representations from Collaborative Experts. arXiv preprint, 2019.

Ze Liu, Yutong Lin, Yue Cao, Han Hu, Yixuan Wei, Zheng Zhang, Stephen Lin, and Baining Guo. Swin Transformer: Hierarchical Vision Transformer Using Shifted Windows. In ICCV, 2021.

Ilya Loshchilov and Frank Hutter. Decoupled Weight Decay Regularization. arXiv preprint, 2017.

(56) References Cited

OTHER PUBLICATIONS

Ilya Loshchilov and Frank Hutter. SGDR: Stochastic Gradient Descent with Warm Restarts. In ICLR, 2017.
Huaishao Luo, Lei Ji, Botian Shi, Haoyang Huang, Nan Duan, Tianrui Li, Jason Li, Taroon Bharti, and Ming Zhou. UniVL: A Unified Video and Language Pre-Training Model for Multimodal Understanding and Generation. arXiv preprint, 2020.
Huaishao Luo, Lei Ji, Ming Zhong, Yang Chen, Wen Lei, Nan Duan, and Tianrui Li. CLIP4clip: An Empirical Study of Clip for End to End Video Clip Retrieval and Captioning. Neurocomputing, 2022.
Yiwei Ma, Guohai Xu, Xiaoshuai Sun, Ming Yan, Ji Zhang, and Rongrong Ji. X-CLIP: End-to-End Multi- Grained Contrastive Learning for Video-Text Retrieval. In ACM MM, 2022.
Muhammad Maaz, Hanoona Rasheed, Salman Khan, and Fa-had Shahbaz Khan. Video-ChatGPT: Towards Detailed Video Understanding via Large Vision and Language Models. arXiv preprint, 2023.
Antoine Miech, Dimitri Zhukov, Jean-Baptiste Alayrac, Makarand Tapaswi, Ivan Laptev, and Josef Sivic. HowTo100M: Learning a Text-Video Embedding by Watching Hundred Million Narrated Video Clips. In ICCV, 2019.
OpenAI. GPT-4 Technical Report. arXiv preprint, 2023.
Kishore Papineni, Salim Roukos, Todd Ward, and Wei-Jing Zhu. BLEU: A Method for Automatic Evaluation of Machine Translation. In ACL, 2002.
Alec Radford, Jong Wook Kim, Chris Hallacy, Aditya Ramesh, Gabriel Goh, Sandhini Agarwal, Girish Sastry, Amanda Askell, Pamela Mishkin, Jack Clark, et al. Learning Transferable Visual Models from Natural Language Supervision. In ICML, 2021.
Colin Raffel, Noam Shazeer, Adam Roberts, Katherine Lee, Sharan Narang, Michael Matena, Yanqi Zhou, Wei Li, and Peter J Liu. Exploring the Limits of Transfer Learning with a Unified Text-to-Text Transformer. The Journal of Machine Learning Research, 2020.
Aditya Ramesh, Mikhail Pavlov, Gabriel Goh, Scott Gray, Chelsea Voss, Alec Radford, Mark Chen, and Ilya Sutskever. Zero-Shot Text-to-Image Generation. In ICML, 2021.
Anna Rohrbach, Marcus Rohrbach, Niket Tandon, and Bernt Schiele. A Dataset for Movie Description. In CVPR, 2015.
Robin Rombach, Andreas Blattmann, Dominik Lorenz, Patrick Esser, and Bjorn Ommer. High-Resolution Image Synthesis with Latent Diffusion Models. In CVPR, 2022.
Nataniel Ruiz, Yuanzhen Li, Varun Jampani, Yael Pritch, Michael Rubinstein, and Kfir Aberman. Dreambooth: Fine Tuning Text-to-Image Diffusion Models for Subject-Driven Generation. In CVPR, 2023.
Chitwan Saharia, William Chan, Saurabh Saxena, Lala Li, Jay Whang, Emily L Denton, Kamyar Ghasemipour, Raphael Gontijo Lopes, Burcu Karagol Ayan, Tim Salimans, et al. Photorealistic Text-to-Image Diffusion Models with Deep Language Understanding. NeurIPS, 2022.
Christoph Schuhmann, Romain Beaumont, Richard Vencu, Cade Gordon, Ross Wightman, Mehdi Cherti, Theo Coombes, Aarush Katta, Clayton Mullis, Mitchell Wortsman, et al. LAION-5B: An Open Large-Scale Dataset for Training Next Generation Image-Text Models. NeurIPS, 2022.
Paul Hongsuck Seo, Arsha Nagrani, Anurag Arnab, and Cordelia Schmid. End-to-End Generative Pretraining for Multimodal Video Captioning. In CVPR, 2022.
Piyush Sharma, Nan Ding, Sebastian Goodman, and Radu Soricut. Conceptual Captions: A Cleaned, Hypernymed, Image Alt-text Dataset For Automatic Image Captioning. In ACL, 2018.
Uriel Singer, Adam Polyak, Thomas Hayes, Xi Yin, Jie An, Songyang Zhang, Qiyuan Hu, Harry Yang, Oron Ashual, Oran Gafni, Devi Parikh, Sonal Gupta, and Yaniv Taigman. Make-a-Video: Text-to-Video Generation Without Text-Video Data. In ICLR, 2023.
Khurram Soomro, Amir Roshan Zamir, and Mubarak Shah. UCF101: A Dataset of 101 Human Actions Classes from Videos in the Wild. arXiv preprint arXiv:1212.0402, 2012.
Hugo Touvron, Thibaut Lavril, Gautier Izacard, Xavier Martinet, Marie-Anne Lachaux, Timothee Lacroix, Baptiste Rozi ere, Naman Goyal, Eric Hambro, Faisal Azhar, et al. LLaMA: Open and Efficient Foundation Language Models. arXiv preprint, 2023.
Thomas Unterthiner, Sjoerd Van Steenkiste, Karol Kurach, Raphael Marinier, Marcin Michalski, and Sylvain Gelly. Towards Accurate Generative Models of Video: A New Metric & Challenges. arXiv preprint, 2018.
Ramakrishna Vedantam, C. Lawrence Zitnick, and Devi Parikh. CIDEr: Consensus-based Image Description Evaluation. In CVPR, 2015.
Jiuniu Wang, Hangjie Yuan, Dayou Chen, Yingya Zhang, Xiang Wang, and Shiwei Zhang. ModelScope Text-to-Video Technical Report. arXiv preprint, 2023.
Teng Wang, Ruimao Zhang, Zhichao Lu, Feng Zheng, Ran Cheng, and Ping Luo. End-to-End Dense Video Captioning with Parallel Decoding. In ICCV, 2021.
Wenjing Wang, Huan Yang, Zixi Tuo, Huiguo He, Junchen Zhu, Jianlong Fu, and Jiaying Liu. VideoFactory: Swap Attention in Spatiotemporal Diffusions for Text-to-Video Generation. arXiv preprint, 2023.
Xin Wang, Jiawei Wu, Junkun Chen, Lei Li, Yuan-Fang Wang, and William Yang Wang. VaTex: A Large-Scale, High-Quality Multilingual Dataset for Video-and Language Research. In ICCV, 2019.
Yi Wang, Kunchang Li, Yizhuo Li, Yinan He, Bingkun Huang, Zhiyu Zhao, Hongjie Zhang, Jilan Xu, Yi Liu, Zun Wang, et al. Internvideo: General Video Foundation Models via Generative and Discriminative Learning. arXiv preprint, 2022.
Yi Wang, Yinan He, Yizhuo Li, Kunchang Li, Jiashuo Yu, Xin Ma, Xinhao Li, Guo Chen, Xinyuan Chen, Yaohui Wang, et al. InternVid: A Large-scale Video-Text Dataset for Multimodal Understanding and Generation. arXiv preprint arXiv:2307.06942, 2023.
Chenfei Wu, Lun Huang, Qianxi Zhang, Binyang Li, Lei Ji, Fan Yang, Guillermo Sapiro, and Nan Duan. GODIVA: Generating Open-Domain Videos from Natural Descriptions. arXiv preprint, 2021.
Jialian Wu, Jianfeng Wang, Zhengyuan Yang, Zhe Gan, Zicheng Liu, Junsong Yuan, and Lijuan Wang. Grit: A Generative Region-to-Text Transformer for Object Understanding. arXiv preprint, 2022.
Haiyang Xu, Qinghao Ye, Ming Yan, Yaya Shi, Jiabo Ye, Yuanhong Xu, Chenliang Li, Bin Bi, Qi Qian, Wei Wang, et al. mPLUG-2: A Modularized Multi-modal Foundation Model Across Text, Image and Video. arXiv preprint, 2023.
Jun Xu, Tao Mei, Ting Yao, and Yong Rui. MSR-VTT: A Large Video Description Dataset for Bridging Video and Language. In CVPR, 2016.
Hongwei Xue, Tiankai Hang, Yanhong Zeng, Yuchong Sun, Bei Liu, Huan Yang, Jianlong Fu, and Baining Guo. Advancing High-Resolution Video-Language Representation with Large-Scale Video Transcriptions. In CVPR, 2022.
Antoine Yang, Arsha Nagrani, Paul Hongsuck Seo, Antoine Miech, Jordi Pont-Tuset, Ivan Laptev, Josef Sivic, and Cordelia Schmid. Vid2Seq: Large-Scale Pretraining of a Visual Language Model for Dense Video Captioning. In CVPR, 2023.
Jiahui Yu, Zirui Wang, Vijay Vasudevan, Legg Yeung, Mojtaba Seyedhosseini, and Yonghui Wu. CoCa: Contrastive Captioners are Image-Text Foundation Models. arXiv preprint, 2022.
Jiahui Yu, Yuanzhong Xu, Jing Yu Koh, Thang Luong, Gunjan Baid, Zirui Wang, Vijay Vasudevan, Alexander Ku, Yin-fei Yang, Burcu Karagol Ayan, Ben Hutchinson, Wei Han, Zarana Parekh, Xin Li, Han Zhang, Jason Baldridge, and Yonghui Wu. Scaling Autoregressive Models for Content-Rich Text-to-Image Generation. TMLR, 2022.
Sihyun Yu, Jihoon Tack, Sangwoo Mo, Hyunsu Kim, Junho Kim, Jung-Woo Ha, and Jinwoo Shin. Generating Videos with Dynamics-Aware Implicit Generative Adversarial Networks. arXiv preprint arXiv:2202. 10571, 2022.
Youngjae Yu, Jongseok Kim, and Gunhee Kim. A Joint Sequence Fusion Model for Video Question Answering and Retrieval. In ECCV, 2018.
Lu Yuan, Dongdong Chen, Yi-Ling Chen, Noel Codella, Xiyang Dai, Jianfeng Gao, Houdong Hu, Xuedong Huang, Boxin Li,

(56) References Cited

OTHER PUBLICATIONS

Chunyuan Li, et al. Florence: A New Foundation Model for Computer Vision. arXiv preprint, 2021.
Rowan Zellers, Ximing Lu, Jack Hessel, Youngjae Yu, Jae Sung Park, Jize Cao, Ali Farhadi, and Yejin Choi. Merlot: Multimodal Neural Script Knowledge Models. NeurIPS, 2021.
Hang Zhang, Xin Li, and Lidong Bing. Video-LLaMa: An Instruction-tuned Audio-Visual Language Model for Video Understanding. arXiv preprint, 2023.
Richard Zhang, Phillip Isola, Alexei A Efros, Eli Shechtman, and Oliver Wang. The Unreasonable Effectiveness of Deep Features as a Perceptual Metric. In CVPR, 2018.
Susan Zhang, Stephen Roller, Naman Goyal, Mikel Artetxe, Moya Chen, Shuohui Chen, Christopher Dewan, Mona Diab, Xian Li, Xi Victoria Lin, et al. OPT: Open Pre-trained Transformer Language Models. arXiv preprint, 2022.
Tianyi Zhang, Varsha Kishore, Felix Wu, Kilian Q. Weinberger, and Yoav Artzi. BERTScore: Evaluating Text Generation with Bert. arXiv preprint, 2019.
Daquan Zhou, Weimin Wang, Hanshu Yan, Weiwei Lv, Yizhe Zhu, and Jiashi Feng. MagicVideo: Efficient Video Generation with Latent Diffusion Models. arXiv preprint, 2022.
Luowei Zhou, Chenliang Xu, and Jason Corso. Towards Automatic Learning of Procedures from Web Instructional Videos. In AAAI, 2018.
Deyao Zhu, Jun Chen, Xiaoqian Shen, Xiang Li, and Mohamed Elhoseiny. MiniGPT-4: Enhancing Vision-Language Understanding with Advanced Large Language Models. arXiv preprint, 2023.
Tsai-Shien Chen; Aliaksandr Siarohin; Willi Menapace; Ekaterina Deyneka; Hsiang-wei Chao; Byung Eun Jeon; Yuwei Fang; Hsin-Ying Lee; Jian Ren; Ming-Hsuan Yan; Sergey Tulyakov; Panda-70M: Captioning 70M Videos With Multiple Cross-Modality Teachers. arXiv:2402. 1947v1 [cs.CV] Feb. 29, 2024.
International Search Report and Written Opinion for International Application No. PCT/US2025/012400, dated May 13, 2025 (May 13, 2025)—15 pages.
Sihan Chen, Handong Li, Qunbo Wang, Zijia Zhao, Mingzhen Sun, Xinxin Zhu, and Jing Liu "VAST: A Vision-Audio-Subtitle-Text-Omni-Modality Foundation Model and Dataset," arXiv:2305:18500v1 [cs:CV], May 29, 2023.
Bofeng Wu; Guocheng Niu, Jun Yu, Xinyan Xiao, Jian Zhang, and Hua Wu, "Weakly Supervised Dense Video Captioning via Jointly Usage of Knowledge Distillation and Cross-Modal Matching," arXiv:2105.08252v1 [cs.CV], May 18, 2021.
Sihan Chen, Xingjian He, Longteng Guo, Xinxin Zhu, Weining Wang, Jinhui Tang, and, Jing Liu " VALOR: Vision-Audio-Language Omni-Perception Pretraining Model and Dataset," arXiv:2304.08345v1 [cs.LG], Apr. 17, 2023.
Muhammad Arslan Manzoor, Sarah Albarri, Ziting Xian, Zaiqiao Meng, Preslav Nakov, and, Shangsong Liang, "Multimodality Represenation Learning: A Survey on Evolution, Pretraining and Its Applications," ACM Transactions on Multimedia Computing Communications and Applications, Association for Computing Machinery, Aug. 29, 2023.
Muhammad Rafiq, Ghazala Rafiq, and Gyu Sang Choi, "Video Description: Datasets and Evaluation Metrics," IEEE Access, IEEE, USA, vol. 9, pp. 121665-121685, Aug. 27, 2021.

* cited by examiner

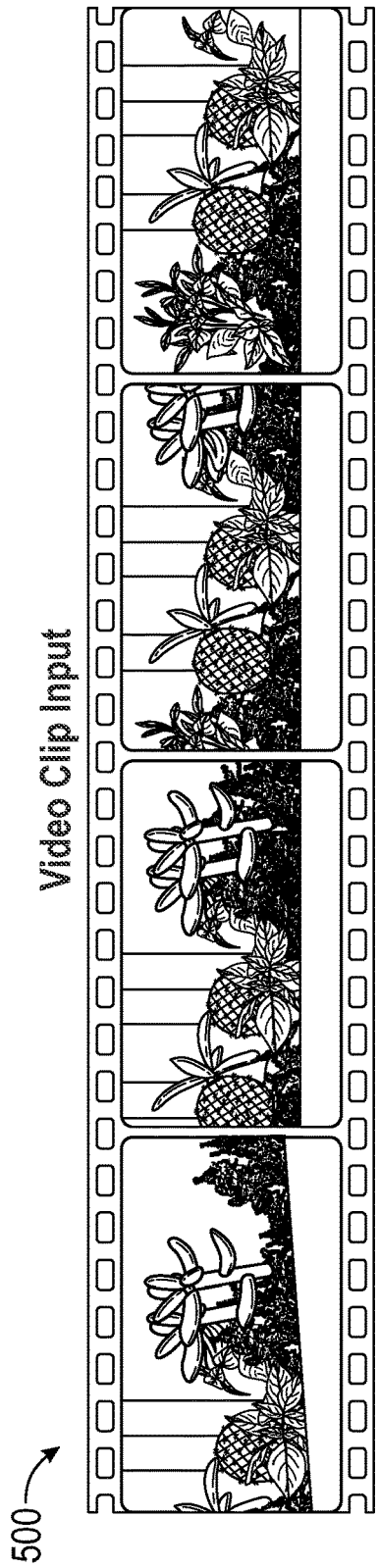

Video Clip Input

Text Input (Optional)

[Title] Succulent Garden | Easy DIY | Interior Design | DIY Decorating Ideas
[Subtitles] Here I have 17 Different Species and it Makes it Kind of Fun and Interesting.
[Description] Succulents, Indoor Succulents, How to Make a Living Succulent Garden.

Predictions and Annotation

[Video-LLaMA] "Monaco - June 03, 2018 Cactus, Flowers, Plants"
[Student (vid)] "A Close up of a Bunch of Cactus Plants"
[Student (vid+txt)] "A Bunch of Different Species of Cacti and Succulents"
[Annotation] "It is a Succulent Garden with Different Species of Cacti and Other Succulents Growing in Pots."

FIG. 5

CAPTIONING VIDEOS WITH MULTIPLE CROSS-MODALITY TEACHERS

TECHNICAL FIELD

The present subject matter relates to automatic captioning of large volumes of visual data, such as videos, with text descriptions.

BACKGROUND

The quality of the data and the annotations provide an upper-bound to the quality of a downstream model. While there exist large text corpora and image-text pairs, high-quality video-text data remains difficult to collect.

BRIEF DESCRIPTION OF THE DRAWINGS

In the drawings, which are not necessarily drawn to scale, like numerals may describe similar components in different views. Some nonlimiting examples are illustrated in the figures of the accompanying drawings in which:

FIG. 5 is an illustration depicting predictions of captioning with and without text inputs;

DETAILED DESCRIPTION

Figure 1:
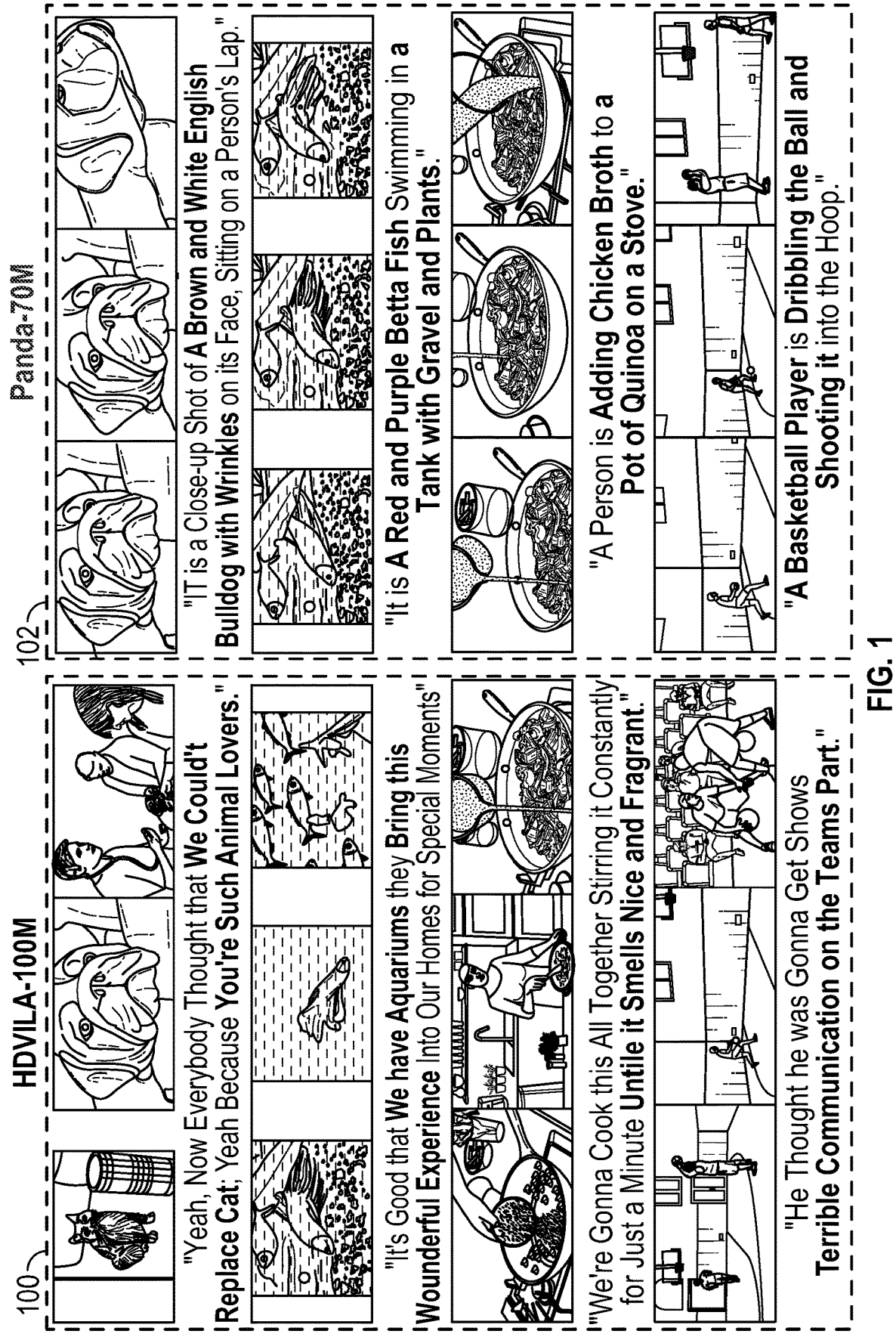
FIG. 1 includes illustrations depicting examples of captioning using a large scale dataset and an example dataset according to this disclosure.

This disclosure includes examples of automatic captioning pipelines and methods for automatically annotating video data with subtitles, which can be obtained using automatic speech recognition (ASR). An automatic captioning pipeline with inputs of multimodal data scales up the dataset of high-quality video-caption pairs. The automatic captioning pipeline generates video-caption pairs by establishing and using a large video-language dataset along with an automatic captioning approach leveraging multimodal inputs, such as textual video description, subtitles, and individual video frames.

A large number of high-resolution videos may be curated from publicly available datasets, where the videos are split into semantically consistent video clips, and then multiple cross-modality teacher models are applied to obtain captions for each video clip. A retrieval model is fine-tuned on a relatively small subset of the video clips where the best caption of each video clip is manually selected and then the retrieval model is applied to the dataset in its entirety to select the best caption as the annotation.

In examples described herein, 70 million (70M) videos pairs are generated with high-quality text captions, referred to generally in this disclosure as a Panda-70M dataset. The value of the dataset is illustrated on three downstream tasks: video captioning, video and text retrieval, and text-driven video generation. The models trained on the data score substantially better on the majority of metrics across all the tasks.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the present subject matter may be realized and attained by means of the methodologies, instrumentalities and combinations particularly pointed out in the appended claims.

In the following detailed description, numerous specific details are set forth by way of examples to provide a thorough understanding of the relevant teachings. However, it should be apparent to those skilled in the art that the present teachings may be practiced without such details. In other instances, well known methods, procedures, components, and circuitry have been described at a relatively high-level, without detail, to avoid unnecessarily obscuring aspects of the present teachings.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate, or carry the light or signals.

Reference now is made in detail to the examples illustrated in the accompanying drawings and discussed below.

Large-scale multimodal learning typically requires very large amounts of data and heavy computational demands. Most breakthroughs are achieved by large-scale computing infrastructure, large-scale models, and large-scale data. Due to these three components, there are powerful text-to-image and image-to-text models. Scaling the model size, or the computation demand, is challenging and expensive, however, these challenges can generally be solved with a finite amount of engineering time. Scaling the data is relatively more challenging as it takes time for a human to analyze each sample.

The computing community has collected millions and even billions of datasets representing image-text pairs. In comparison, video-text pairs are harder to obtain. First, annotating videos is more time-consuming, as an annotator is required to watch the entire video before labeling. Second, videos often contain multiple scenes or events stitched together and include temporally varying content. Finally, meta-information itself, such as subtitles, video description, or voice-over, is often too broad and not correctly aligned in time and cannot precisely describe a video. For example, several 100 million (100M)-scale datasets, such as HD-VILA-100M and HowTo100M, are annotated by ASR. However, these datasets, such as the HD-VILA-100M dataset demonstrated at 100 in FIG. 1, have subtitles that often fail to include the main content and action presented in the video. This limits the value of such datasets for multimodal training. Some publicly available datasets are summarized in Table 1. Some have low resolution, some are captioned using ASR, some contain data from a limited domain, some are small-scale, and some offer short captions.

TABLE 1

| Dataset | Year | Text | Domain | #Videos | Avg/Total | Video Len | Avg Text Len | Resolution |
|---|---|---|---|---|---|---|---|---|
| HowTo100M | 2019 | ASR | Open | 136M | 3.6 s | 134.5 Khr | 4.0 Words | 240p |
| YT-Temporal-180M | 2021 | ASR | Open | 180M | — | — | — | — |
| HD-VILA-100M | 2022 | ASR | Open | 103M | 13.4 s | 371.5 Khr | 32.5 Words | 720p |
| MSVD | 2011 | Caption | Open | 1970 | 9.7 s | 5.3 h | 8.7 Words | — |
| LSMDC | 2015 | Caption | Movie | 118K | 4.8 s | 158 h | 7.0 Words | 1080p |
| MSR-VTT | 2016 | Caption | Open | 10K | 15.0 s | 40 h | 9.3 Words | 240p |
| DiDeMo | 2017 | Caption | Flickr | 27K | 6.9 s | 87 h | 8.0 Words | — |
| Activity Net | 2017 | Caption | Action | 100K | 36.0 s | 849 h | 13.5 Words | — |
| You Cook2 | 2018 | Caption | Cooking | 14K | 19.6 s | 176 h | 8.8 Words | — |
| Panda-70M | 2023 | Caption | Open | 70.8M | 8.5 s | 166.8 Khr | 13.2 Words | 720p |

This disclosure includes examples of captioning pipelines that automatically annotate video data with subtitles to create large-scale datasets generated by ASR. The automatic captioning pipeline, with inputs of multimodal data, scales up the dataset of high-quality video-caption pairs. In an example, a Panda-70M dataset, is generated. Some samples of the Panda-70M dataset are shown at 102 in FIG. 1. The Panda-70M dataset includes high-resolution videos from an open (public) domain source with rich captions averaging 13.2 words per caption. While manually annotating 70M videos is prohibitively expensive and time consuming, examples in this disclosure utilize automatic annotation. An important insight is that a video typically comes with information from a plurality of modalities that can assist automatic captioning utilities. This includes the title, description, subtitles of the video, individual static frames, and the video itself. When only one modality is used, the value of this data cannot be fully maximized. In comparison, this disclosure utilizes different combinations of multimodal data as inputs to a plurality of cross-modality teachers. By using different models to caption a subset of videos and evaluating the results by showing them to humans, it is seen that there is no single model able to generate good captions for more than 35% of videos. However, by jointly collecting all the captions from different models, it is observed that 88.8% of videos can be annotated with at least one good caption.

Figure 2:
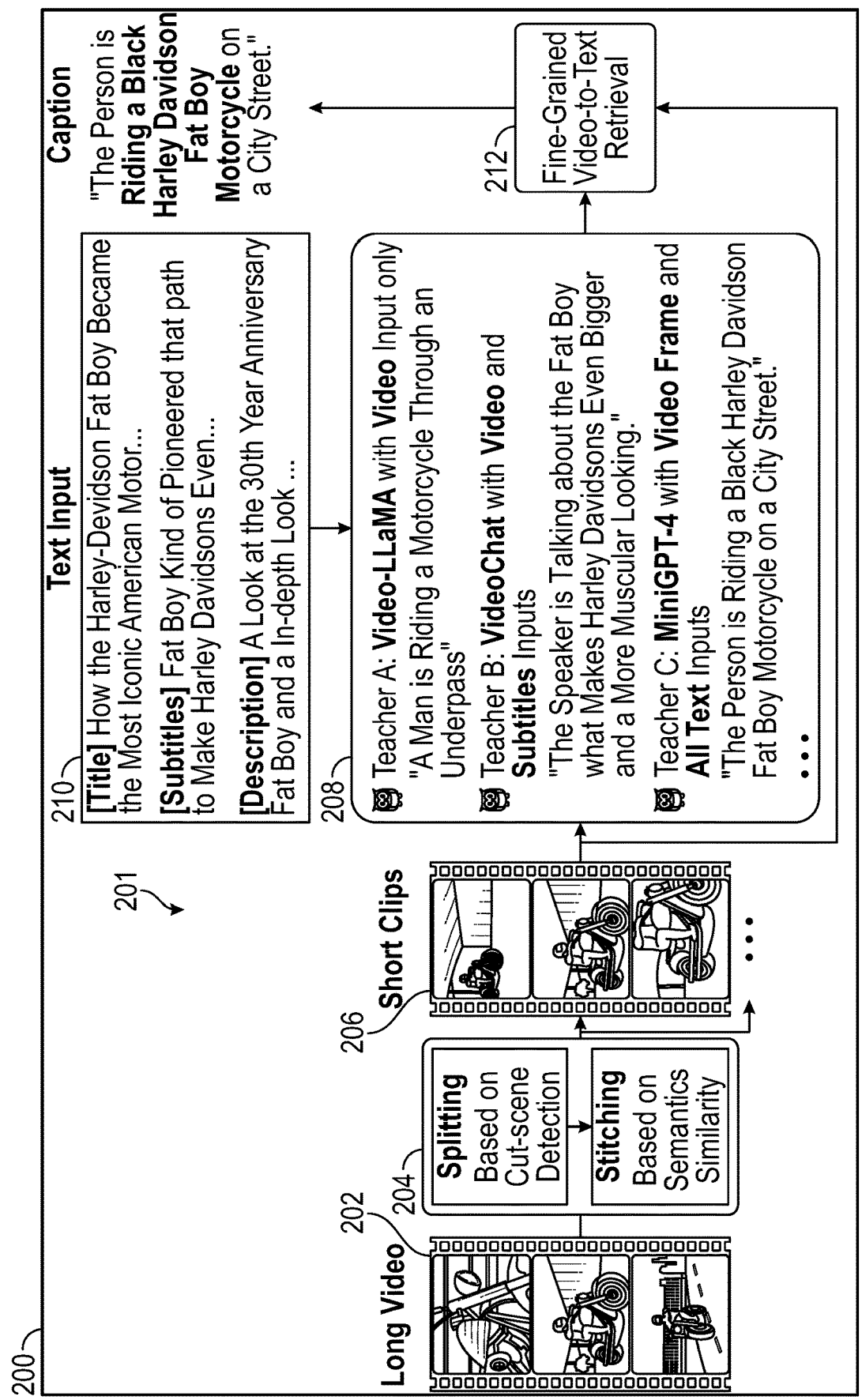
FIG. 2 is a flow diagram depicting steps of a method of automatic captioning using a pipeline.

FIG. 2 is a flow chart 201 depicting steps of an example method of an automatic captioning pipeline 200 for building the Panda-70M dataset by selecting 3.8M high-resolution videos 202 from the HD-VILA-100M dataset and processing them using the following three steps. First, a semantics-aware video splitting algorithm 204 cuts long videos 202 into semantically consistent clips 206 while striking a balance between semantics coherence and the duration of the video clips. In total, 70M semantically consistent video clips are obtained. Second, a range of cross-modality teacher models 208 are used, including image captioning models and image/video visual-question-answering (VQA) models with an additional text input 210, such as video description and subtitles, to predict several candidate captions for a video clip. Lastly, a one hundred thousand (100K) video dataset is collected where human annotators select the best caption for each video. This dataset is then used to finetune a fine-grained video-to-text (V2T) retrieval model 212 and select a precise caption in order to annotate the entire dataset.

Running multiple teacher models 208 on all the data may be relatively expensive and time-consuming. To achieve efficient video annotation at scale, in one example, the system uses a student captioning model that is trained to distill the knowledge from the teachers models 208. The student model adopts a two-branch architecture that takes both visual and textual inputs to benefit the captioning process using multimodal information.

Extensive experiments demonstrate that pretraining with the Panda-70M dataset facilitates several downstream tasks, including video captioning, video and text retrieval, and text-driven video generation. Training a student model in a knowledge distillation manner facilitates developing a strong student model, which outperforms any single teacher model by more than 7.7% preference ratio as shown in Table 4 (below), where the performance is further enhanced by additional text inputs, like video description and subtitles.

A desired video sample in a video-captioning dataset should have two somewhat contradictory characteristics. On the one hand, the video should be semantically consistent, so the caption can accurately express its semantics content without ambiguity. On the other hand, the video cannot be too short or fragmentary to contain meaningful motion content, which is beneficial to downstream tasks, such as text-to-video generation. To accomplish both goals, in some examples the system uses a two-stage semantics-aware splitting algorithm 204 to cut a long video 202 into semantically coherent clips 206. In the first stage, the long video 202 is split based on cut-scene detection, as the semantics often change when a new scene starts. In the second stage, adjacent clips are stitched if they are incorrectly separated by the first stage, ensuring the videos do not end up being too short. To do so ImageBind, available from Meta of Menlo Park, California, may be used to extract embeddings of video frames and merge the adjacent clips of embeddings if the previous clip's last frame and the following clip's first frame are close. Additional procedures handle 1) long videos without any cut scenes, 2) videos using fade-in or fade-out transitions which are not usually detected as cut scenes, and 3) removal of redundant clips to increase the diversity of the dataset.

In a first stage (Stage 1), splitting is performed based on cut-scene detection. In an example, a long video 202 is split into video clips 206 using a tool for detecting shot changes in videos that automatically splits the video into separate clips (e.g., PySceneDetect). A utility such as ContentDetector, compares the difference in content between adjacent frames against a set threshold/score, which if exceeded, triggers a scene cut. A cutscene_threshold is set to 25 and min_scene_len is set to 15 frames. A two-step post-processing algorithm handles 1) long videos 206 with the transition, such as fade-in and fade-out effects, which cannot be detected as a cut-scene, or 2) unedited footage that does not contain any cut-scenes.

In the first step, the maximum length of a video clip 206 is set as 5 seconds. If a video clip 206 is longer than the maximum length, the first 5 seconds is recursively cut as a new video clip 206 until the remaining video satisfies the condition. Video clip 206 should be semantically consistent. Hence, the ImageBind features are extracted at the beginning and ending frames and the video clip 206 is removed if two frames are perceptually different. Specifically, given a n-frames video clip C, the features f($C_A$) and f($C_B$) are extracted for the frames $C_A$ and $C_B$ which are number 0.1×n and 0.9×n frames of the video clip 206. The video clips 206 are kept if satisfying ∥f($C_A$)−((($C_B$)∥≤1.0. As such, a video clip 206 is excluded with transition effect or has dramatically different semantics at the beginning and the ending.

In a second stage (Stage 2), stitching is performed based on semantics similarity. To avoid fragmenting the long video 202 by stage 1, adjacent video clips 206 are stitched into one if they are semantically similar. Formally, given two adjacent video clips C1 and C2 in sequence, they are concatenated into a video clip 206 if satisfying ∥f($C1_B$)−f($C2_A$)∥≤0.6.

Figure 7:
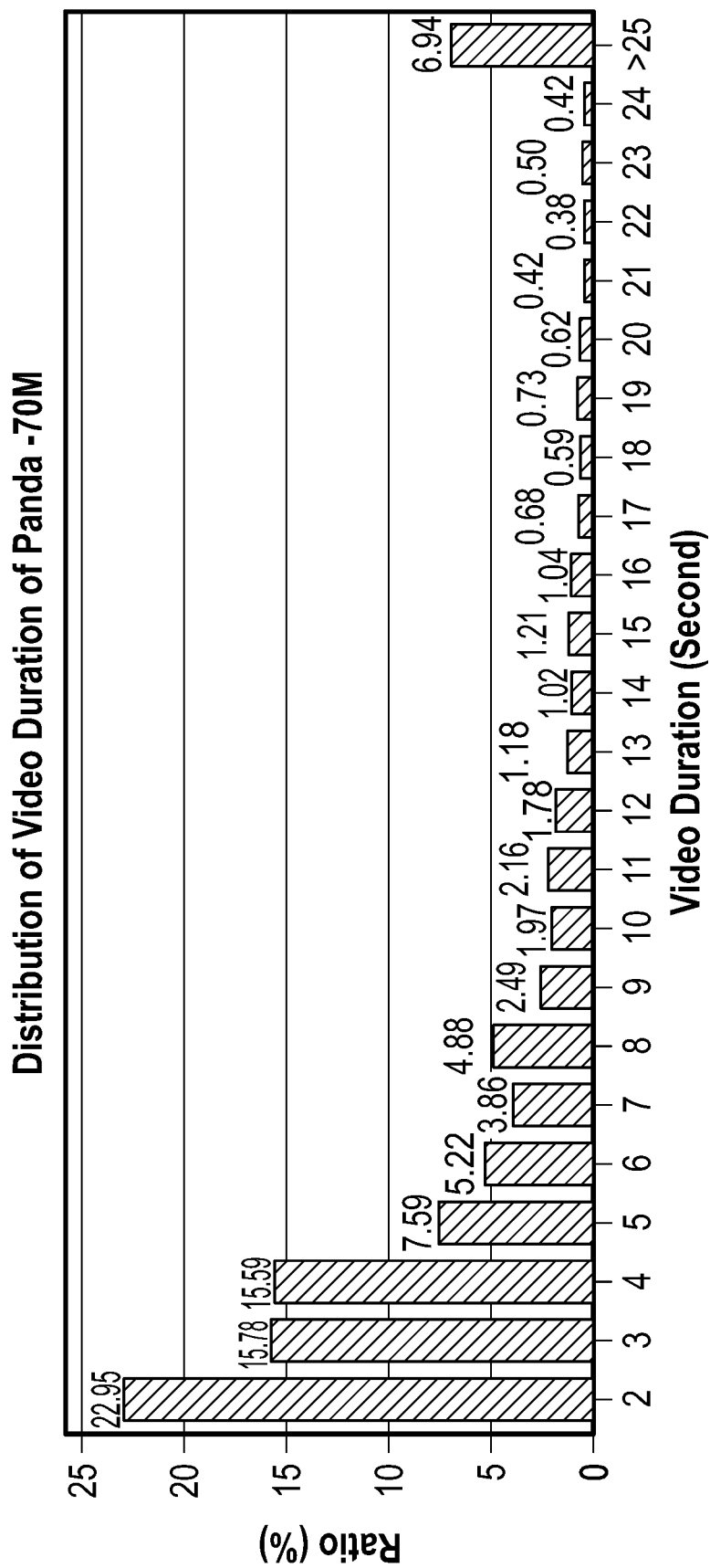
FIG. 7 is a chart depicting a plot of a distribution of a video length after video clip splitting.

Post-processing is performed to stabilize the quality and diversity of the video clips 206 with the following steps. First, video clips 206 shorter than 2 seconds or only contain slight motion (i.e., ∥f(CA)−f(CB)∥≤0.15) are excluded. For the videos longer than 60 seconds, only the first 60 seconds are retained. Next, each video clip 206 is represented by the average ImageBind features extracted from stage 1 and only video clips 206 are kept which are semantically different (i.e., Euclidean distance >0.3) from the precedent video clips 206 to increase the diversity of the video samples. Finally, the first and last 10% of a video clip 206 is trimmed out as the beginning and the ending usually contain unstable camera movement or transition effect. With the splitting algorithm, 3,790,459 long videos 202 are split into 70,817,315 video clips 206 with the average video clip duration of 8.477 seconds. A plot of the distribution of the video length is shown in FIG. 7.

To quantitatively verify the semantic consistency of a video clip 206, Max Running LPIPS is used, which highlights the most significant perceptual change within a video clip 206. Formally, given an n-seconds-long video clip 206, the video frames are subsampled each second and denoted the keyframes as {$f_1$, ..., $f_n$}. The Max Running LPIPS is formulated below as Equation 1:

$$\max(\{LPIPS(f_i, f_i, +1) \mid i \in [1, n-1]\}) \quad (1)$$

where LPIPS (·, ·) is the perceptual similarity of two images. As shown in Table 2, splitting achieves a better semantics consistency than the splitting based on the alignment of subtitles sentences, while maintaining longer video length than the vanilla cut-scene detection.

TABLE 2

| Method | Max Running LPIPS↓ | Avg Len |
|---|---|---|
| Sub. Align | 0.408 | 11.8 s |
| PyScene Detect | 0.247 | 4.1 s |
| Splitting | 0.256 | 7.9 s |

Videos in the HD-VILA-100M dataset contain rich multimodal information beneficial for video captioning. Hence, in addition to the video itself, textual information may be used, such as video title, description, subtitles, as well as static images, like individual video frames, for captioning. Based on this observation, several captioning models may be leveraged with the inputs of different modalities.

The automatic captioning pipeline 200 having multiple cross-modality teacher models 208 is used. In an example, a large pool including 31 captioning teacher models 208 is used. Since inferring all teacher models 208 on the 70M video clips is prohibitively expensive, a short list of eight well-performing teacher models 208 is constructed based on a user study. The list is shown in the y-axis of FIG. 3. The teacher models 208 are composed of five base models with different pretraining weights and input information. The five base models include Video LLaMA (video VQA), VideoChat (video VQA), VideoChat Text (natural language model which first textualizes the video content and summarizes it with a large language model (LLM)), BLIP-2 (image captioning), and MiniGPT-4 (image VQA) shown in Table 3. To implement video captioning by the teacher models 208 with diverse modalities, distinct captioning processes tailored to each modality are formulated. For example, for the VQA models, in addition to visual data, a prompt is also input, including additional text information, such as video description and subtitles, and the teacher models 208 are asked to summarize all multimodal inputs into one sentence.

TABLE 3

| Base Model | Type | Weights | Input Information | | | | # of Models |
|---|---|---|---|---|---|---|---|
| | | | V | V-S | V-M | V-S-M | |
| Video-LLaMA | Video VQA | Pretrain/Finetune | ✓ | ✓ | ✓ | ✓ | 8 |
| Video Chat | Video VQA | 7B | ✓ | ✓ | ✓ | ✓ | 4 |
| Video Chat Text | NLP | — | ✓ | ✓ | ✓ | ✓ | 4 |
| Video-Chat GPT | Video VQA | — | ✓ | ✓ | ✓ | ✓ | 4 |
| BLIP-2 | Image Captioning | opt2.7b/Opt6.7b/Flant5x1 | ✓ | X | X | X | 3 |
| Mini GPT-4 | Image VQA | 7B/13B | ✓ | ✓ | ✓ | ✓ | 8 |

The captioning process of each teacher model 208 lists the inference details of each base model. Three suitable base models include Video-LlaMA, VideoChat, and VideoChat Text. These models are described in turn below.

Video-LLaMA: For all teacher models 208, the system uses the vision branch and not the audio branch and uses Vicuna-7B as the LLM. Two official weights are used, including the pretraining weights, which are trained on 2.5M video-text pairs and LLaVA-CC3M, and finetuned weights, which are further finetuned on instruction-tuning data.

VideoChat: the system uses Vicuna-7B as the LLM and the official codebase for the rest of setting is followed.

VideoChat Text: The model is a natural-language processing (NLP) based algorithm, which first textualizes the video content into video tags by a Swin Transformer, dense captions by GRIT, and a general caption by T5 language model. The original codebase uses ChatGPT-4 as the chatbot to implement VQA. LLAMA may be used for large-scale captioning.

The teacher models 208 using different modalities perform well on different kinds of videos. For example, video teacher models 208 can perform better on videos with complex dynamics due to the additional modules to handle temporal information. On the other hand, for videos with rare and uncommon objects, image teacher models 208 can accurately caption since they were trained using large-scale datasets of image text pairs. Finally, for videos that are visually hard to understand, VQA teacher models 208 have leverage as they can employ additional textual inputs. This is supported by a numerical evaluation where a user study was conducted where the participants are asked to select the best caption from eight teacher model candidates. The selective rate was plotted for each teacher model in FIG. 3. The results show that the best captions are generated by various teacher models 208. On the other hand, the highest selective rate of a single teacher BLIP-2 with opt6.7b is only 17.85% implying the limited captioning capability of a single teacher model 208 on a wide variety of videos.

Given multiple candidate captions for a video, the caption that best aligns to the video content is used. Available generic retrieval often fails to pick the optimal result. One reason is that generic models are trained using contrastive learning objectives. They are asked to distinguish one sample from other completely unrelated samples. In contrast, in this disclosure all of the candidate captions are highly relevant to the video sample and require the teacher model 208 to discern subtle distinctions within each caption for optimal performance.

The retrieval model 212 is tailored to a "fine-grained" retrieval scenario, a subset of 100 K videos is collected, for which human annotators select the caption containing the most correct and detailed information about the main content of the video. This subset is split to get 98 K training and 2 K testing samples. An Unmasked Teacher (UMT) is finetuned on this dataset and hard negative mining is implemented for contrastive loss, where the seven captions not selected by annotators compose the hard negative samples and are assigned a larger training weight.

Figure 3:
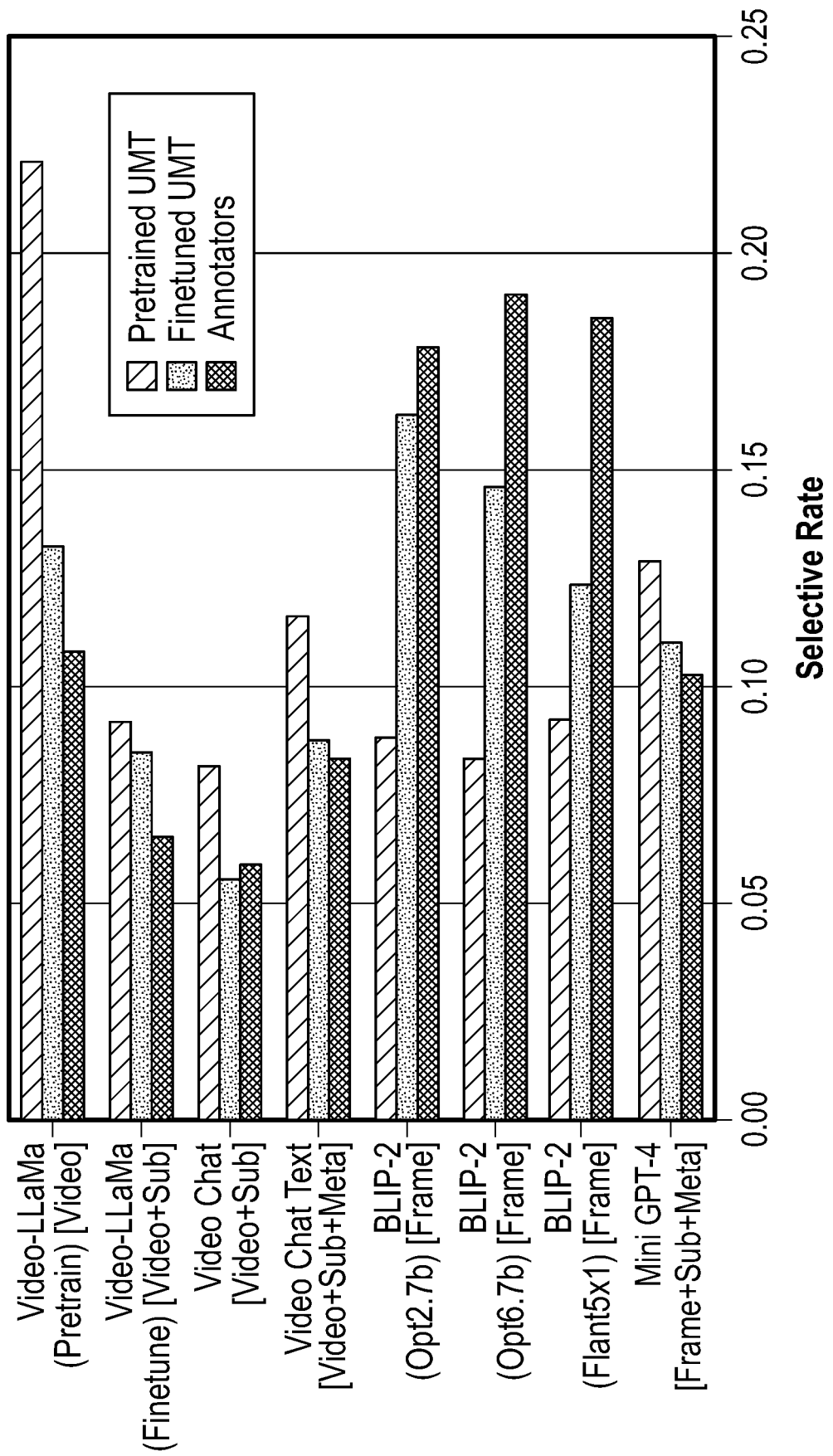
FIG. 3 is a chart including a list of eight well-performing teacher models.

The retrieval performance of UMTs is quantitatively evaluated with and without finetuning on the testing set, where experiments indicate that a finetuned UMT can achieve 35.90% R@1 accuracy which significantly outperforms pretrained UMT which has 21.82% R@1. It is noted that another human agreement annotation only achieves 48% R@1 as the retrieval would be subjective when there is more than one equally well-performing caption. As shown in FIG. 3, a finetuned UMT can select the captions distributed similarly to human-selected captions.

While the automatic captioning pipeline 200 can generate accurate captions, the heavy computational demands may hinder its capability to expand the dataset to an even larger scale. For example, 8+1 different models may be needed to annotate a single video clip. According to this disclosure, a student captioning model is trained on the Panda-70M dataset to distill the knowledge from multiple teacher models 208.

Figure 4:
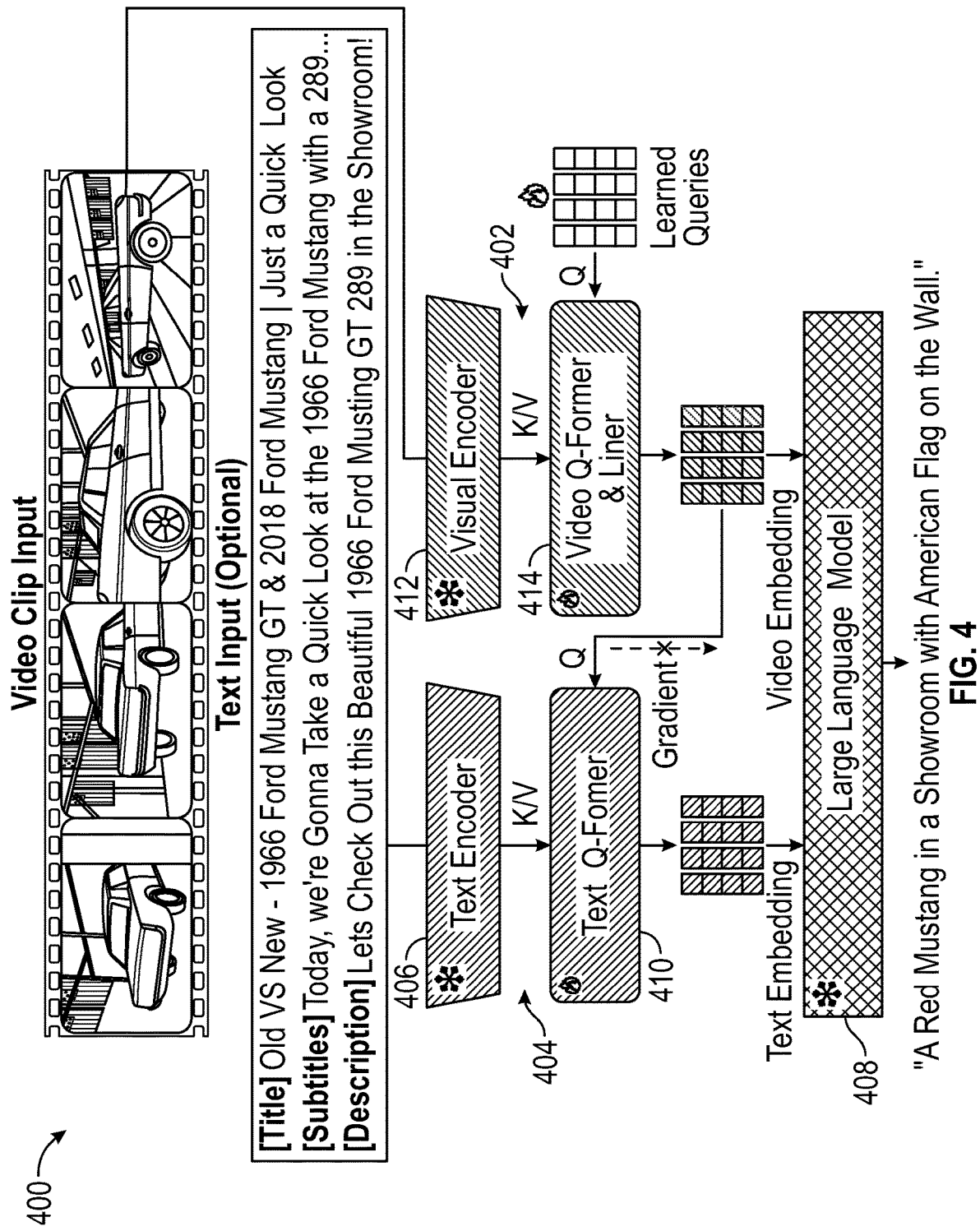
FIG. 4 is an illustration depicting a student captioning model including a vision branch and a text branch leveraging multimodal inputs including vision and text.

As shown in FIG. 4, a student captioning model 400 includes a vision branch 402 and a text branch 404 leveraging multimodal inputs including vision and text. For the vision branch 402, the Video-LLaMA is used to extract LLM-compatible video embedding. For the text branch 404, text embedding extracted by a text encoder 406 is directly input into the LLM 408. However, this may lead to two issues: first, the text prompt with video description and subtitles can be too long, dominating the decision of the LLM 408 and burdening heavy computation; second, the information from description and subtitles may be noisy and not necessarily aligned with the content of the video. To address these issues, example systems include a text Q-former 410 that extracts the text embedding with fixed length and better bridges the video and text embeddings. The text Q-former 410 has the same architecture as the Query Transformer in BLIP-2. During the student captioning model training, the gradient propagation from the text branch 404 to vision branch 402 is blocked and training is based on the visual encoder 412 and a Video Q-former & Liner 414 on the video input.

Some samples of the Panda-70M dataset are shown at 102 in FIG. 1. To quantitatively evaluate the effectiveness of the Panda-70M dataset, pretraining performance is tested on three downstream applications: video captioning, video and text retrieval, and video generation.

To evaluate the performance of the student captioning model 400 on video captioning, Video-LLaMA was used with vision branch 402 as the base model. Two pretraining weights were compared: the official weight, which is jointly trained on 2.5M video-text pairs and 595 K image-text pairs, and the weight trained on a Panda-2M dataset from scratch. The Panda-2M dataset is a randomly sampled subset of the Panda-70M dataset and shares the same amount of training samples as the official weight. The student captioning model 400 is also trained with both video and text branches 402 and 404, respectively, on the complete Panda-70M dataset for better captioning performance. For all models, the same backbone is used which includes Vicuna-7B as LLM 408, ViT and video Q-Former as visual encoder 412, and the linear projection layer from MiniGPT-4. For Panda-2M pretraining, only the video and caption data is used without using other textual information for a fair comparison. For the training of the student captioning model 400, in addition to the video, the metadata and subtitles were also randomly input into the student captioning model 400.

Zero-shot video captioning was tested on two benchmarks: MSR VTT and MSVD. For MSR-VTT, it contains 10 K videos with 20 manually annotated captions for each video, and the results on the 2,990 testing split were reported. For MSVD, it consists of 1,970 videos with a total 80 K of descriptions, where the numbers on the 670 testing videos were reported. Note that no training or validation videos are used from the downstream datasets. To quantitatively evaluate the quality of output captions, common protocols are followed and report BLEU-4, ROGUE-L, METEOR, and CIDEr. All the metrics were computed using the pycocoevalcap package. BERTScore was also computed to evaluate the contextual similarity for each token in ground truth and prediction captions. The results are shown in Table 4. For a fair comparison, no additional text information was input to the student model 400 during the inference on the downstream datasets. FIG. 5 showcases at 500 a video sample from the testing set of the Panda-70M dataset and several captions predicted from different teacher models 208 for the qualitative comparison.

TABLE 4

| Method | Pretraining Data | MSR-VTT | | | | | MSVD | | | | |
|---|---|---|---|---|---|---|---|---|---|---|---|
| | | B4↑ | R↑ | M↑ | C↑ | BERT↑ | B4↑ | R↑ | M↑ | C↑ | BERT↑ |
| Video-LLaMA | 2.5M Vid + 595K Img | 5.8 | 30.0 | 15.9 | 14.3 | 84.5 | 12.7 | 43.0 | 23.6 | 38.5 | 87.3 |
| Video-LLaMA | Panda-2M | 24.3 | 49.6 | 27.4 | 30.0 | 87.8 | 32.3 | 60.7 | 35.4 | 47.6 | 90.2 |
| Student | Panda-70M | 28.4 | 53.4 | 30.8 | 34.9 | 90.5 | 36.9 | 65.6 | 39.1 | 54.3 | 93.8 |

As shown in Table 4, Video-LLaMA with Panda-2M pretraining weight achieves a significantly superior performance compared to the official weight. Numerically, this pretraining weight yields 18.5% and 19.6% improvement respectively on MSR-VTT and MSVD in terms of B-4. As shown in FIG. 5, the caption from the original Video-LLaMA contains irrelevant and generic information, such as date and location. In comparison, prediction according to this disclosure better aligns to the video content.

To evaluate the performance of the student model 400, a user study was conducted where participants were asked to select the best caption from ten candidates for each video. Ten captions were predicted from eight teacher models 208 and two student models with different inputs (with and without text). The preference ratio of each model was reported and the R@1 accuracy of the finetuned UMT (i.e., all teachers) is shown in Table 5. The video samples were collected from the testing set which had not been seen during the training of the student model and UMT. As shown in Table 5, the student model 400 outperforms any single model and achieved a compatible performance with all teacher models 208.

TABLE 5

| Model | Preference Ratio↑ |
|---|---|
| Video-LLaMA (Pretrain) | 9.4 |
| Video-LLaMA (Finetune) | 7.0 |
| Video Chat | 7.7 |
| Video Chat Text | 3.3 |
| BLIP-2 (Opt2.7b) | 10.7 |
| BLIP-2 (Opt6.7b) | 9.0 |
| BLIP-2 (Flant5x1) | 9.9 |
| Mini GPT-4 | 3.1 |
| Student (Video Input) | 18.4 |
| Student (Video + Text Inputs) | 21.4 |
| All Teachers | 23.3 |

The student model 400 supports cross-modality inputs to leverage from additional textual information. This is supported by the numerical evaluation in Table 5 where the student model 400 with both video and text inputs outperforms the counterpart with video input only by 3% preference ratio. Qualitatively, the captioning predictions are shown with and without text inputs in FIG. 5. While the prediction with pure video input can include partial content of the video, like "cactus", the counterpart with both video and text inputs can more comprehensively include the key words such as "succulents" and "different species" from the video title, description, and subtitles.

UMT was used as the base model to evaluate the performance on video and text retrieval. The standard protocols jointly use 3M images from CC3M and 2.5M videos as the pretraining datasets. Thus, a Panda-5M subset was randomly sampled, which shares the same number of training samples as the standard pretraining dataset, for a fair comparison. For both datasets, the same backbone composed of ViT-L/16 and BERTlarge was used. The official weights for the standard datasets were used and the model was trained from scratch for the Panda-5M dataset.

Zero-shot retrieval was tested on three benchmarks: MSR-VTT, DiDeMo, and MSVD. For MSR-VTT, the common protocol was followed to evaluate on 1K testing split. For DiDeMo, it contains 10K Flickr videos with a total of 40K dense captions. As in the previous standard, paragraph-to-video retrieval was evaluated by concatenating all sentence descriptions of one video into a single query. The results on the 1K testing set were reported. For MSVD, the results on the 670 testing videos were reported. The standard metric was employed and R@1, R@5, R@10 accuracy is reported on both text-to-video and video-to-text retrieval in Table 6.

TABLE 6

| Method | Pretraining Data | MSR-VTT | | | DiDeMo | | | MSVD | | |
|---|---|---|---|---|---|---|---|---|---|---|
| | | R@1↑ | R@5↑ | R@10↑ | R@1↑ | R@5↑ | R@10↑ | R@1↑ | R@5↑ | R@10↑ |
| Text-to-Video Retrieval | | | | | | | | | | |
| Align Prompt | 2.5M Vid + 3M Img | 24.1 | 44.7 | 55.4 | 23.8 | 47.3 | 57.9 | — | — | — |
| Bridge Former | 2.5M Vid + 3M Img | 26.0 | 46.4 | 56.4 | 25.6 | 50.6 | 61.6 | 43.6 | 74.9 | 84.9 |
| UMT | 2.5M Vid + 3M Img | 30.2 | 51.3 | 61.6 | 33.6 | 58.1 | 65.5 | 66.3 | 85.5 | 89.3 |
| UMT | Panda-5M | 37.2 | 58.1 | 69.5 | 34.2 | 58.4 | 66.5 | 71.2 | 88.4 | 92.7 |
| Video-to-Text Retrieval | | | | | | | | | | |
| UMT | 2.5M Vid + 3M Img | 33.3 | 58.1 | 66.7 | 32.1 | 57.3 | 66.7 | 44.4 | 73.3 | 82.4 |
| UMT | Panda-5M | 36.3 | 61.0 | 69.7 | 33.4 | 57.9 | 65.8 | 37.2 | 65.1 | 75.6 |

Table 6 illustrates that the Panda-5M dataset pretraining outperforms official weight on most of the datasets. Notably, the pretraining yields a 7.0% lift in terms of R@1 on MSR-VTT. Although the pretraining performs worse on video-to-text retrieval on MSVD, Table 6 highlights that MSVD is an early established dataset and some of the videos are low-resolution (320×240 px) which causes a domain gap with the dataset.

To evaluate the effectiveness on text-to-video generation, AnimateDiff was used as the base model, and the officially released weight was compared, which is trained on 2.5M text-video pairs, and the weight trained on the Panda-2M dataset, a 2.5M subset of Panda-70M. The official codebase was followed and Stable Diffusion v1.5 (SD) was used as a base text-to-image (T2I) generator. During training, T2I modules were fixed and the motion modeling modules were trained. For each training video, 16 frames were sampled with the stride of 4, and then resized and center-cropped to 256×256 px resolution.

Figure 6:
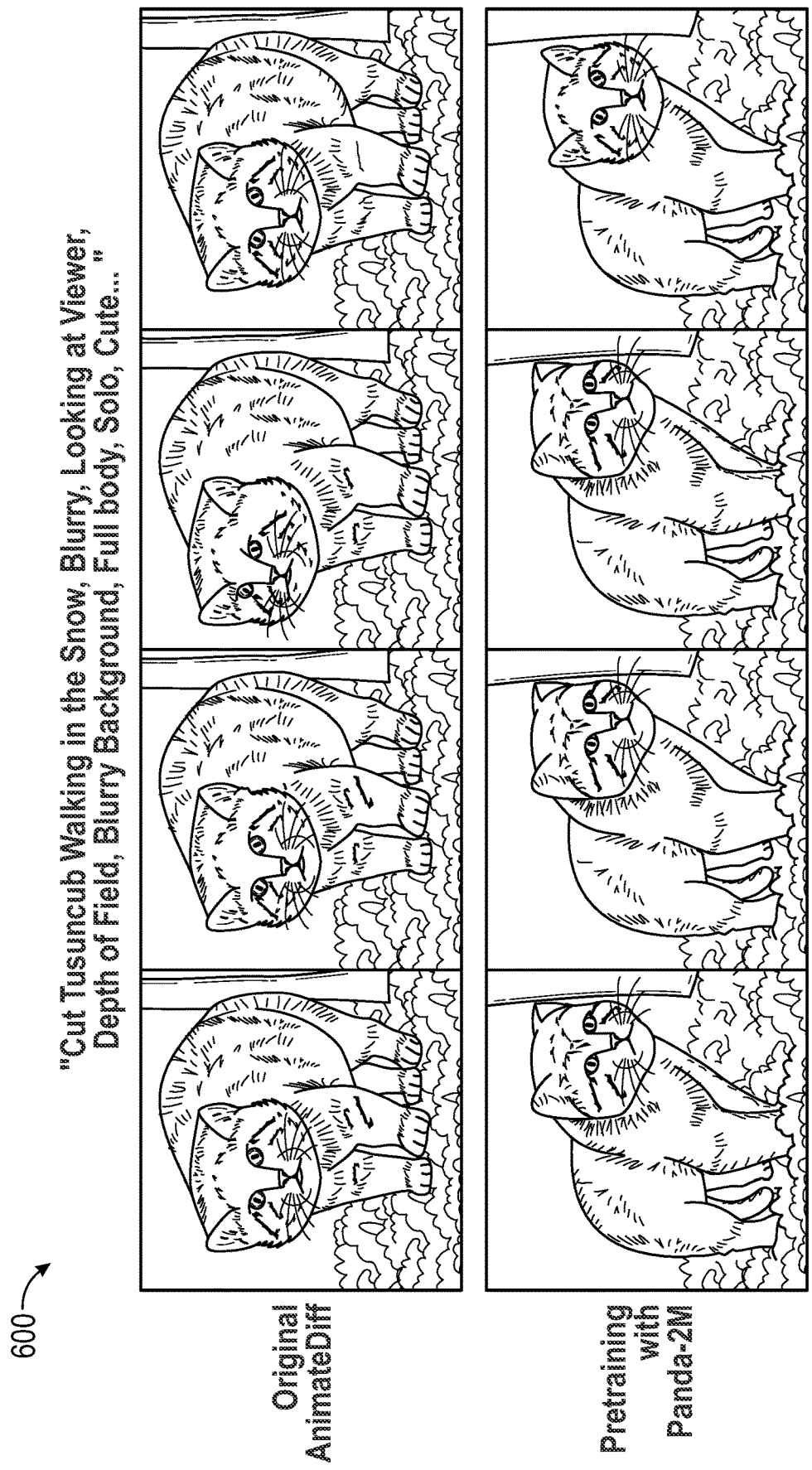
FIG. 6 is an illustration depicting example generated video samples.

To evaluate the models, evaluation protocols were followed for zero-shot evaluation on UCF101 and MSR-VTT. Specifically, 16 frame videos were generated in 256×256 px resolution. For UCF101, a text prompt was produced for each class and 10,000 videos were generated which share the same class distribution as the original dataset. Fre'chet Video Distance (FVD) was computed on the I3D embeddings. For MSR-VTT, a video sample was generated for each of the 59,800 test prompts and CLIP similarity (CLIPSim) was computed. The numbers are reported in Table 7. The generated video samples are shown at 600 in FIG. 6. To visualize the results, the official codebase was followed and SD T2I was replaced with personalized Dreambooth weight, TUSUN. Note that the test prompt and the video sample from the AnimtateDiff with official weight (top row in FIG. 6) are from the project page of AnimateDiff.

TABLE 7

| Method | (#) P-T Videos | UCF101 FVD↓ | MSR-VTT CLIPSim↑ |
| --- | --- | --- | --- |
| Cog Video | 5M | 701.6 | — |
| Magic Video | 10M | 699.0 | — |
| LVDM | 18K | 641.8 | 0.2751 |
| Model Scope | 10M | 639.9 | 0.3000 |
| Video LDM | 10M | 550.6 | — |
| Animate Diff | 2.5M | 499.3 | 0.2869 |
| Animate Diff | Panda2M | 421.9 | 0.2880 |

The Panda-2M dataset pretraining consistently showed a superior performance on both metrics compared to the official weight. As highlighted, the pretraining yields 77.4 lower FVD on UCF101 and outperforms state-of-the-art models pretrained on a dataset within 10M scale in terms of FVD. Qualitatively, pretraining with the dataset results in the generation of watermark-free videos with more meaningful motion and photorealistic appearance.

Figure 8:
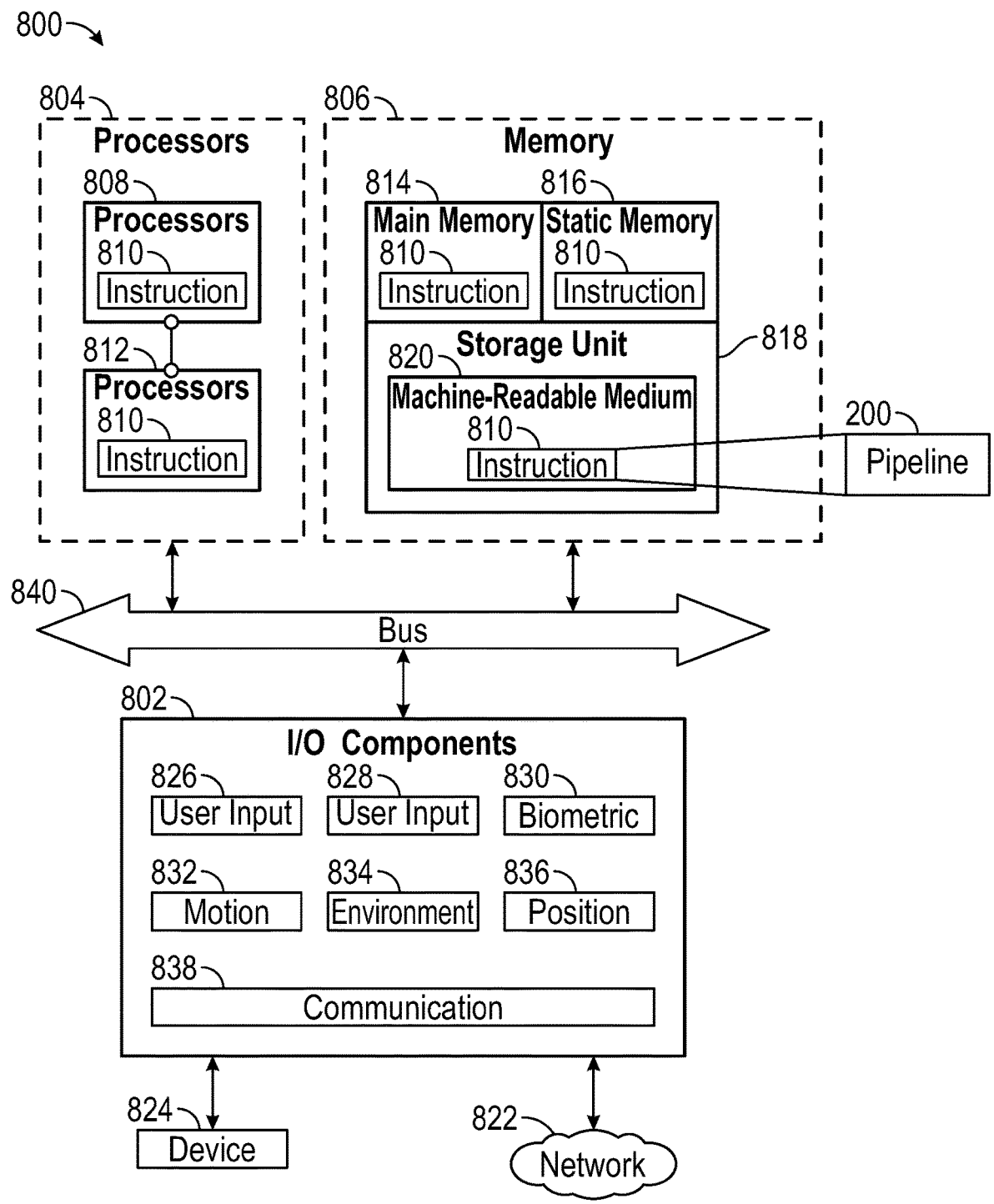
FIG. 8 is a block diagram of a machine within which instructions for performing any one or more of the methodologies described herein may be executed.

FIG. 8 is a diagrammatic representation of the machine 800 within which instructions 810 (e.g., software, a program, an application, an applet, an app, or other executable code) for causing the machine 800 to perform any one or more of the methodologies discussed herein may be executed. For example, instructions 810 may cause the machine 800 to execute any one or more of the methods described herein including for automatic captioning pipeline 200. Instructions 810 transform the general, non-programmed machine 800 into a particular machine 800 programmed to carry out the described and illustrated functions in the manner described. The machine 800 may operate as a standalone device or may be coupled (e.g., networked) to other machines. In a networked deployment, machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 810, sequentially or otherwise, that specify actions to be taken by the machine 800. Further, while only a single machine 800 is illustrated, the term "machine" shall also be taken to include a collection of machines that individually or jointly execute the instructions 810 to perform any one or more of the methodologies discussed herein. In some examples, the machine 800 may also comprise both client and server systems, with certain operations of a particular method or algorithm being performed on the server-side and with certain operations of the particular method or algorithm being performed on the client-side.

The machine 800 may include processors 804, memory 806, and input/output I/O components 802, which may be configured to communicate with each other via a bus 840. In an example, the processors 804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 808 and a processor 812 that execute the instructions 810. The term "processor" is intended to include multi-core processors that may comprise two or more independent processors (sometimes referred to as "cores") that may execute instructions contemporaneously. Although FIG. 8 shows multiple processors 804, the machine 800 may include a single processor with a single core, a single processor with multiple cores (e.g., a multi-core processor), multiple processors with a single core, multiple processors with multiples cores, or any combination thereof.

Memory 806 includes a main memory 814, a static memory 816, and a storage unit 818, both accessible to the processors 804 via the bus 840. The main memory 806, the static memory 816, and storage unit 818 store the instructions 810 for any one or more of the methodologies or functions described herein. The instructions 810 may also reside, completely or partially, within the main memory 814, within the static memory 816, within machine-readable medium 820 within the storage unit 818, within at least one of the processors 804 (e.g., within the Processor's cache memory), or any suitable combination thereof, during execution thereof by the machine 800.

The I/O components 802 may include a wide variety of components to receive input, provide output, produce output, transmit information, exchange information, capture measurements, and so on. The specific I/O components 802 that are included in a particular machine will depend on the type of machine. For example, portable machines such as mobile phones may include a touch input device or other such input mechanisms, while a headless server machine will likely not include such a touch input device. It will be appreciated that the I/O components 802 may include many other components that are not shown in FIG. 8. In various examples, the I/O components 802 may include user output components 826 and user input components 828. The user output components 826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 802 may include biometric components 830, motion components 832, environmental components 834, or position components 836, among a wide array of other components. For example, the biometric components 830 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 832 include acceleration sensor components (e.g., accelerometer), gravitation sensor components, rotation sensor components (e.g., gyroscope).

The environmental components 834 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

The position components 836 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 802 further include communication components 838 operable to couple the machine 800 to a network 822 or devices 824 via respective coupling or connections. For example, the communication components 838 may include a network interface Component or another suitable device to interface with the network 822. In further examples, the communication components 838 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 824 may be another machine or any of a wide variety of peripheral devices (e.g., a peripheral device coupled via a USB).

Moreover, the communication components 838 may detect identifiers or include components operable to detect identifiers. For example, the communication components 838 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 638, such as location via Internet Protocol (IP) geolocation, location via Wi-Fi® signal triangulation, location via detecting an NFC beacon signal that may indicate a particular location, and so forth.

The various memories (e.g., main memory 814, static memory 816, and memory of the processors 804) and storage unit 818 may store one or more sets of instructions and data structures (e.g., software) embodying or used by any one or more of the methodologies or functions described herein. These instructions (e.g., the instructions 810), when executed by processors 804, cause various operations to implement the disclosed examples including automatic captioning pipeline 200.

The instructions 810 may be transmitted or received over the network 822, using a transmission medium, via a network interface device (e.g., a network interface component included in the communication components 838) and using any one of several well-known transfer protocols (e.g., hypertext transfer protocol (HTTP)). Similarly, the instructions 810 may be transmitted or received using a transmission medium via a coupling (e.g., a peer-to-peer coupling) to the devices 824.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A pipeline configured to automatically annotate video data with subtitles, the pipeline configured to:
   curate a plurality of high-resolution videos from a publicly available dataset;
   split the videos into semantically consistent video clips;
   apply multiple cross-modality teacher models to obtain captions for each of said video clips; and
   enable a student captioning model to learn on the dataset to distill knowledge from the teacher models, the student captioning model including a vision branch and a text branch configured to leverage inputs of multimodal data to the teacher models, wherein during training of the student captioning model a gradient propagation from the text branch to the vision branch is blocked.

2. The pipeline of claim 1, wherein the pipeline is configured to use automatic speech recognition (ASR) to automatically annotate the video data with subtitles.

3. The pipeline of claim 1, wherein the teacher models have different pretraining weights and are configured to receive different input information.

4. The pipeline of claim 1, wherein the pipeline is configured to fine-tune a subset of the video clips using a retrieval model where an accurate caption of each of the video clips can be manually selected.

5. The pipeline of claim 4, wherein the subset is configured to be split to get training samples and testing samples.

6. The pipeline of claim 4, wherein after the fine-tuning of the subset, the pipeline is configured to use the retrieval model on an entirety of the dataset to select an accurate caption as an annotation.

7. The pipeline of claim 1, wherein the pipeline is configured to scale-up the dataset to high-quality video-caption pairs.

8. The pipeline of claim 7, wherein the multimodal data comprises textual video description, subtitles, and individual video frames.

9. The pipeline of claim 1, wherein the vision branch is configured to be used to extract large language model (LLM) compatible video embedding and the text branch includes a text encoder and a text Q-former configured to extract text embedding with fixed length to bridge the video and text embeddings.

10. A method of using a pipeline to automatically annotate video data with subtitles, the method comprising the steps of:
    curating a plurality of high-resolution videos from a publicly available dataset;
    splitting the videos into semantically consistent video clips;
    applying multiple cross-modality teacher models to obtain captions for each said video clip; and
    enabling a student captioning model to learn on the dataset to distill knowledge from the teacher models, the student captioning model including a vision branch and a text branch leveraging inputs of multimodal data to the teacher models, wherein during training of the student captioning model a gradient propagation from the text branch to the vision branch is blocked.

11. The method of claim 10, wherein the pipeline uses automatic speech recognition (ASR) to automatically annotate the video data with subtitles.

12. The method of claim 10, wherein the teacher models have different pretraining weights and receive different input information.

13. The method of claim 10, wherein the pipeline fine-tunes a subset of the video clips using a retrieval model where an accurate caption of each of the video clips can be manually selected.

14. The method of claim 13, wherein the subset is split to get training samples and testing samples.

15. The method of claim 13, wherein after the fine-tuning of the subset, the pipeline uses the retrieval model on an entirety of the dataset to select an accurate caption as an annotation.

16. The method of claim 10, wherein the pipeline scales-up the dataset to high-quality video-caption pairs.

17. The method of claim 16, wherein the multimodal data comprises textual video description, subtitles, and individual video frames.

18. A non-transitory computer readable medium storing program code, which when executed, is operative to cause a pipeline to perform the steps of:
    curating a plurality of high-resolution videos from a publicly available dataset;
    splitting the videos into semantically consistent video clips;
    applying multiple cross-modality teacher models to obtain captions for each said video clip; and
    enabling a student captioning model to learn on the dataset to distill knowledge from the teacher models, the student captioning model includes a vision branch and a text branch leveraging inputs of multimodal data to the teacher models, wherein during training of the student captioning model, a gradient propagation from the text branch to the vision branch is blocked.

* * * * *